United States Patent
Creager et al.

(10) Patent No.: US 9,304,543 B2
(45) Date of Patent: Apr. 5, 2016

(54) MASTER MODE AND SLAVE MODE OF COMPUTING DEVICE

(71) Applicant: Hewlett-Packard Development Company, L.P., Fort Collins, CO (US)

(72) Inventors: Gregory Doyle Creager, Boise, ID (US); Glen Oliarny, Boise, ID (US)

(73) Assignee: Hewlett-Packard Development Company, L.P., Houston, TX (US)

(*) Notice: Subject to any disclaimer, the term of this patent is extended or adjusted under 35 U.S.C. 154(b) by 233 days.

(21) Appl. No.: 13/629,066

(22) Filed: Sep. 27, 2012

(65) Prior Publication Data

US 2014/0089543 A1    Mar. 27, 2014

(51) Int. Cl.
  *G06F 13/00* (2006.01)
  *G06F 1/16* (2006.01)
  *G06F 13/364* (2006.01)
  *G06F 13/40* (2006.01)

(52) U.S. Cl.
  CPC ............ *G06F 1/1632* (2013.01); *G06F 13/364* (2013.01); *G06F 13/4081* (2013.01)

(58) Field of Classification Search
  CPC .... G06F 1/1632; G06F 1/1654; G06F 3/1438
  USPC ........................... 710/110, 300–304, 316–317
  See application file for complete search history.

(56) References Cited

U.S. PATENT DOCUMENTS

| | | | |
|---|---|---|---|
| 6,523,124 B1* | 2/2003 | Lunsford et al. ............... | 713/320 |
| 8,566,489 B2* | 10/2013 | Davis et al. ...................... | 710/62 |
| 8,738,946 B2* | 5/2014 | Zhao et al. ...................... | 713/320 |
| 2003/0112585 A1* | 6/2003 | Silvester ........................ | 361/679 |
| 2003/0198008 A1* | 10/2003 | Leapman et al. ............. | 361/681 |
| 2005/0185364 A1* | 8/2005 | Bell et al. ........................ | 361/679 |
| 2007/0180284 A1* | 8/2007 | Tsuji .............................. | 713/323 |
| 2010/0060549 A1* | 3/2010 | Tsern .............................. | 345/2.1 |
| 2010/0060572 A1* | 3/2010 | Tsern .............................. | 345/157 |
| 2010/0064228 A1* | 3/2010 | Tsern .............................. | 715/740 |
| 2010/0250816 A1* | 9/2010 | Collopy et al. ............... | 710/303 |
| 2012/0023463 A1 | 1/2012 | Tseng et al. | |
| 2012/0137038 A1* | 5/2012 | Huang et al. ................... | 710/303 |
| 2012/0162058 A1* | 6/2012 | Davis et al. .................... | 345/156 |
| 2012/0166521 A1* | 6/2012 | Roper et al. ................... | 709/203 |
| 2012/0166676 A1* | 6/2012 | Roper et al. ................... | 709/250 |
| 2012/0166679 A1* | 6/2012 | Zawacki et al. ................... | 710/8 |
| 2012/0166851 A1* | 6/2012 | Davis et al. .................... | 713/324 |
| 2012/0176746 A1* | 7/2012 | Chen et al. ................. | 361/679.55 |
| 2014/0068297 A1* | 3/2014 | An et al. ........................ | 713/320 |

OTHER PUBLICATIONS

"Lenovo Prepares First Hybrid Notebook-tablet for Market", http://www.patentbolt.com/2012/07/lenovo-prepares-first-hybrid-notebook-tablet-for-market.html, Jul. 9, 2012, retrieved on Sep. 26, 2012.
"New Tablet pc/netbook with a Detachable Screen", http://blog.rentourlaptops.com/2009/03/02/new-tablet-pcnetbook-with-a-detachable-screen/, Retrieved on Sep. 26, 2012.
Geier, E.; "Windows 8 Features That Will Benefit Businesses", http://www.pcworld.idg.com.au/article/431535/windows_8_features_will_benefit_businesses/, Jul. 24, 2012, retrieved on Sep. 26, 2012.
Jha, N; "It's raining Windows 8 tablets at Computex", http://www.themobileindian.com/news/6913_Its-raining-Windows-8-tablets-at-Computex_5, Jun. 6, 2012, retrieved on Sept 26, 2012.

* cited by examiner

*Primary Examiner* — Raymond Phan
(74) *Attorney, Agent, or Firm* — HP Patent Department

(57) ABSTRACT

A computing device to couple with a second computing device. The computing device switches between a master mode and a slave mode based on whether the computing device is docked with the second computing device.

20 Claims, 4 Drawing Sheets

MASTER MODE AND SLAVE MODE OF COMPUTING DEVICE

BACKGROUND

When coupling a computing device with another device, such as a docking station, the computing device can couple and interface with the docking station. In response to interfacing with the docking station, the computing device can proceed to utilize one or more expansion and interface ports included on the docking station as ports of the computing device.

BRIEF DESCRIPTION OF THE DRAWINGS

In the accompanying drawings, like numerals refer to like components or blocks. The following detailed description references the drawings, wherein.

DETAILED DESCRIPTION

Figure 1:
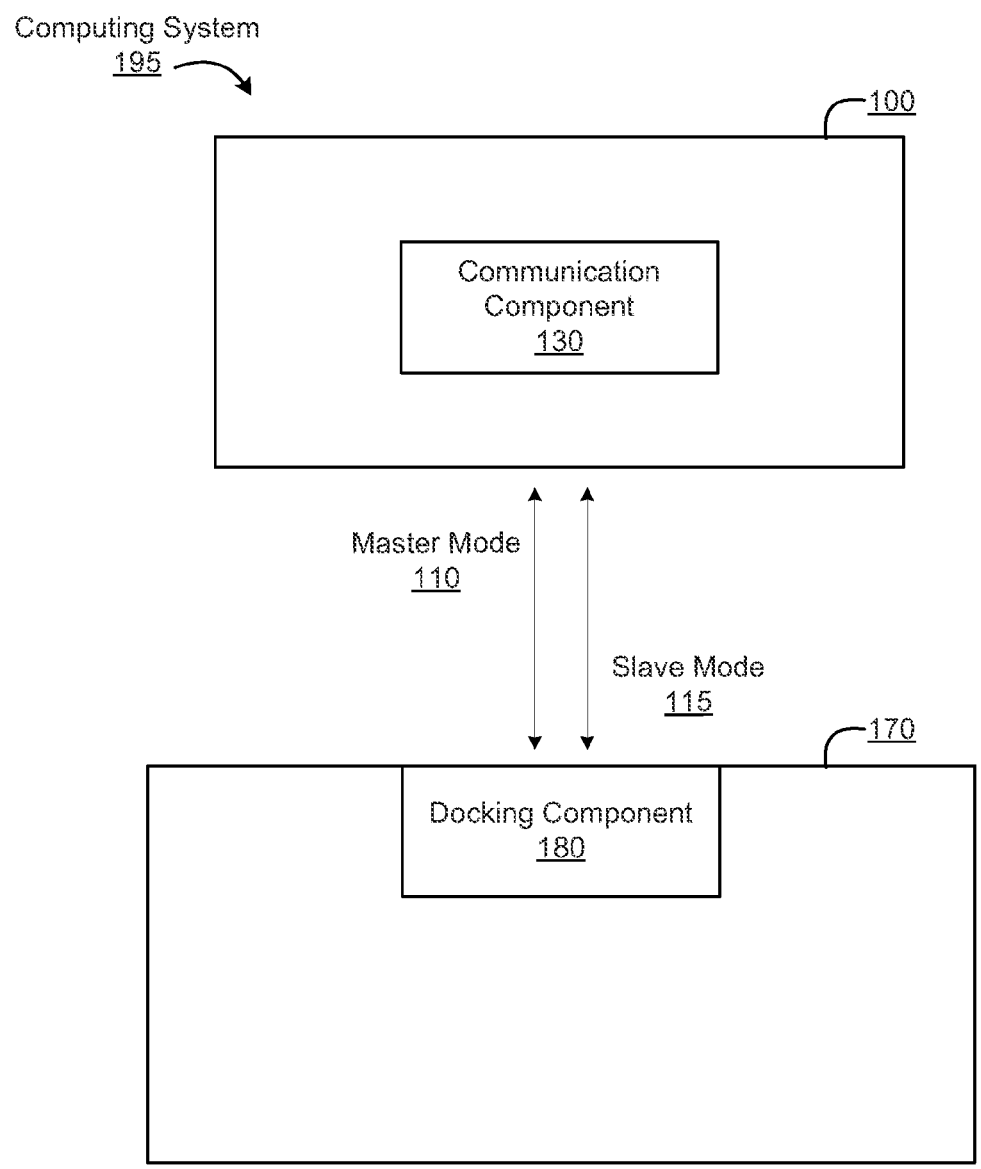
FIG. 1 illustrates a computing system including a first computing device to couple with a second computing device according to an example.

A computing system includes a first computing device, such as a tablet or slate, and a second computing device, such as a base or a docking station. The first computing device switches between a master mode and a slave mode based on whether the first computing device is physically docked to the second computing device. For the purposes of this application, the master mode is an operation mode for a computing device to maintain control of the computing device. In one implementation, when operating in the master mode, the computing device can further control and manage the other computing device operating in a slave mode. The slave mode is an operation mode for one of the computing devices to allow the other computing device, operating in master mode, to control and manage it.

If the first computing device launches the master mode, a first controller of the first computing device, such as a reduced instruction set computing (RISC) processor, can launch a first operating system of the first computing device for the first computing device to operate as a tablet computing device. In one implementation, the second computing device also launches a slave mode for the second computing device to be controlled by the RISC processor and the first operating system.

In another implementation, if the first computing device launches the slave mode, the second computing device proceeds to launch the master mode. A second controller of the second computing device, such as a complex instruction set computing (CISC) processor, launches a second operating system to control and manage both the first computing device and the second computing device. The first computing device and the second computing device operate together as a notebook computing device. In one implementation, the CISC processor and/or the second operating system can include more features and/or functionality than the RISC processor and the first operating system.

For the purposes of this application, the first computing device is physically docked to the second computing device if a docking component of the second computing physically and electrically couples the first computing device to the second computing device. If the first computing device is not physically docked with the second computing device, the first computing device launches the master mode. The second computing device can also launch the slave mode. If the first computing device is physically docked with the second computing device, the first computing device launches the slave mode and the second computing device launches the master mode.

As the first computing device switches between the master mode and slave mode, context is switched to the computing device operating in master mode. For the purposes of this application, context switching includes transferring control of an application from a computing device operating in slave mode to the other computing device operating in master mode. An application can be a document application, a web browser, a media application, a game application, a system management application, a security application, and/or any additional application accessible to either computing device. In one implementation, the computing device operating in master mode also receives a state of the application and/or a file used by the application.

FIG. 1 illustrates a computing system 195 including a first computing device 100 to couple with a second computing device 170 according to an example. The computing system 195 includes a first computing device 100 which can physically dock with a second computing device 170. For the purposes of this application, the first computing device 100 is physically docked with the second computing device 170 if the first computing device 100 is physically and electrically coupled to a docking component 180 of the second computing device 170. Based on whether the first computing device 100 is physically docked with the second computing device 170, the first computing device 100 switches between a master mode 110 and a slave mode 115.

If the first computing device 100 is not physically coupled to the docking component 180, the first computing device 100 launches the master mode 110. In one implementation, the second computing device 170 also launches the slave mode 115. Otherwise, if the first computing device 100 is physically coupled to the docking component 180, the first computing device 100 launches the slave mode 115 and the second computing device 170 launches the master mode 110. The master mode 110 is an operation mode for a computing device to maintain control of the computing device. The computing device operating in the master mode 110 can further control and manage the other computing device operating in slave mode 115. The slave mode 115 is an operation mode for a computing device to allow the other computing device, operating in master mode 110, to control and manage it.

The first computing device 100 can be a tablet, a slate, an a in-one system, a smart phone, a PDA (Personal Digital Assistant), an E (Electronic)-Reader, and/or any additional portable computing device to couple with a second computing device 170. The first computing device 100 includes a communication component 130, such as a Bluetooth component, a near field communication component, an infrared component, and/or a wireless radio, to wirelessly communicate with the second computing device 170 if the first computing device 100 is not physically docked with the second computing device 100.

The first computing device 100 can also include a first controller and/or a first operating system. The first controller can be a reduced instruction set computing (RISC) processor and the first operating system can be a RISC operating system. In one example, if the first computing device 100 is operating in the master mode 110, the first controller and/or the first operating system control the first computing device 100 as a tablet computing device. In another implementation, the first computing device 100 further includes a display component and an input component, such as a touch sensor, a touch screen, and/or an image capture component.

A second computing device 170 can be a base, a docking station, and/or any additional device to physically couple with the first computing device 100. The second computing device 170 includes a docking component 130 to physically and electrically couple the first computing device 100 to the second computing device 170. In one implementation, the second computing device 170 further includes a second controller and/or a second operating system for the second computing device 170 to operate in the master mode 110.

The second controller can be a complex instruction set computing (CISC) processor and the second operating system can be a CISC operating system. In one example, if the second computing device 170 is operating in the master mode 105, the CISC processor and the CISC operating system control both the first computing device 100 and the second computing device 170 for the computing devices to operate together as a notebook computing device. The CISC processor and/or the CISC operating system can include additional or more complex instructions and functions than the RISC processor and/or the RISC operating system.

In one implementation, when a computing device launches the master mode 110 and the other computing device launches the slave mode 115, context is switched from the slave mode 115 computing device to the master mode 110 computing device. For the purposes of this application, context switching includes transferring control of one or more applications from the slave mode 115 computing device to the master mode 110 computing device. An application includes software and/or instructions executed on the slave mode 115 computing device operating. For example, the application can be a document application, a web browser, a media application, a game application, a system management application, and/or a security application. In one implementation, context switching includes the master mode 110 computing device receiving a state of an application and/or a file used by the application.

Figure 2A:
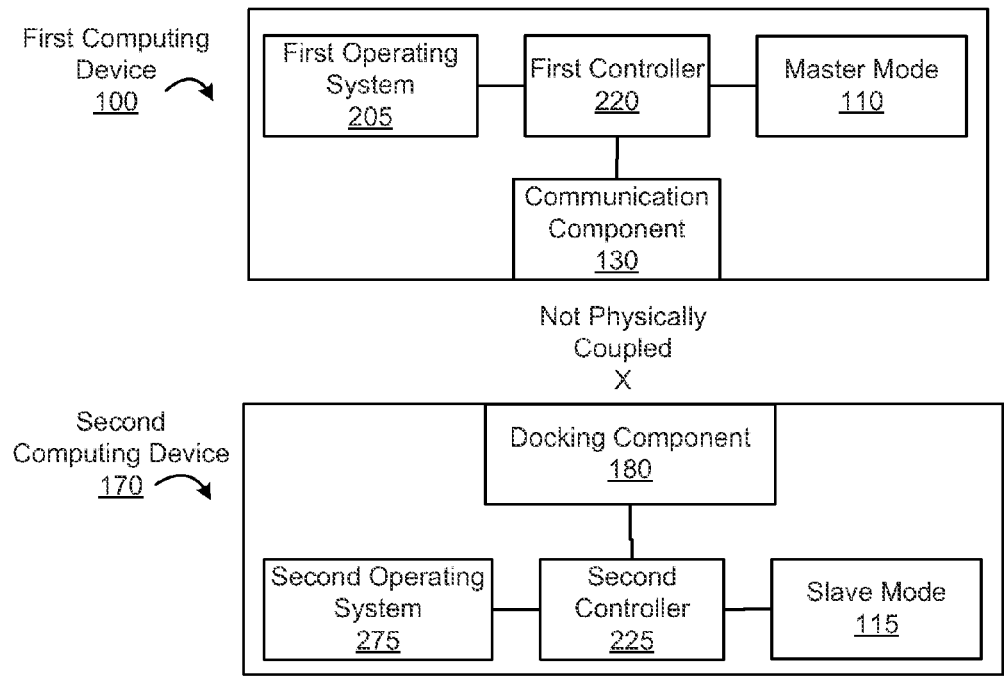
FIG. 2A and FIG. 2B illustrate a first computing device switching between a master mode and a slave mode according to examples.
Figure 2B:
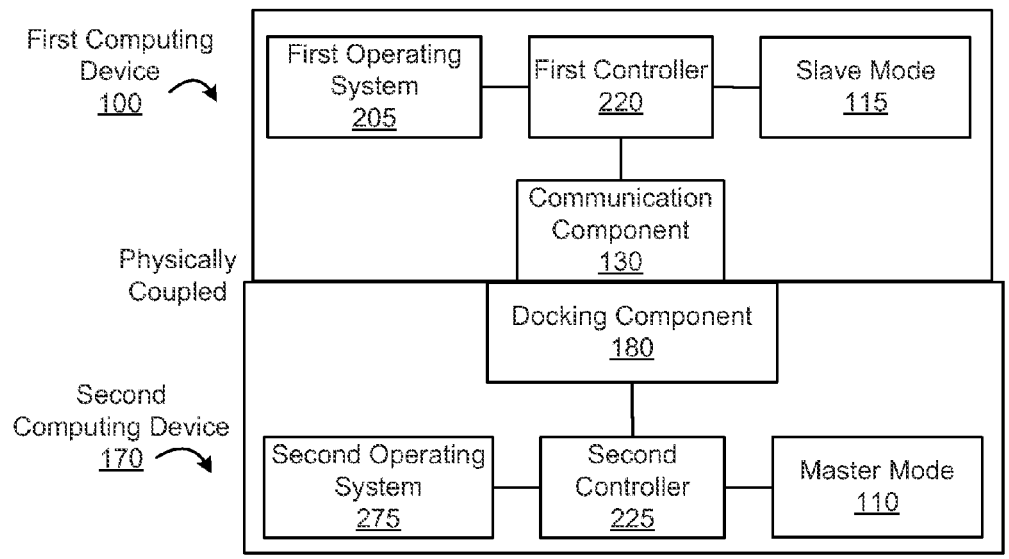

FIG. 2A and FIG. 2B illustrate a first computing device 100 switching between a master mode 110 and a slave mode 115 according to examples. As noted above, the first computing device 100 switches between the master mode 110 and the slave mode 115 based on whether the first computing device 100 is physically docked with a docking component 180 of the second computing device 170. In one implementation, the second computing device 170 also switches between the master mode 110 and the slave mode 115 based on whether the first computing device 100 is physically docked with a docking component 180. If the first computing device 100 launches a master mode 110, the second computing device 170 can launch a slave mode 115 and vice versa.

For the purposes of this application, the docking component 180 is a hardware component which physically and electrically couples the first computing device 100 to the second computing device 170. The docking component 180 can include a mounting component, such as a latch, hook, and/or magnet, to secure the first computing device 100 to the second computing device 170. The docking component 180 also includes electrical components for the first computing device 100 to electrically couple and interface with the second computing device 170.

The first computing device 100 can also include an interface component (not shown) to couple with the docking component 180 and interface the first computing device 100 with the second computing device 170. The interface component notifies a first controller 220 of the first computing device 100 if the interface component is coupled to the docking component 180 of the second computing device 170. Similarly, the docking component 180 notifies a second controller 225 of the second computing device 170 if the docking component 180 is coupled to the interface of the first computing device 100. The notification can be provided to the first controller 220 and the second controller 225 as one or more signals.

If the interface component does not provide notification that that the first computing device 100 is physically docked with the docking component 180, the first controller 220 launches a master mode 110 on the first computing device 100. The first controller 220 can be a processor, such as a reduced instruction set computing (RISC) processor. The RISC processor can be a semiconductor-based microprocessor, or any other device suitable for retrieval and execution of instructions. In one implementation, the first controller 220 includes logic instead of or in addition to a processor. As an alternative or in addition to fetching, decoding, and executing instructions, the first controller 220 may include one or more integrated circuits (ICs) or other electronic circuits that comprise a plurality of electronic components for performing the functionality described below.

The first controller 220 further launches a first operating system 205 in response to launching the master mode 110. The first operating system 205 is a reduced instruction set computing (RISC) operating system and includes software and/or firmware to be used independently and/or in conjunction with the first controller 220 to control the first computing device 100. When the first computing device 100 is operating in the master mode 110, the first controller 220 and/or the first operating system 205 control the first computing device 100.

In one implementation, if the first computing device 100 launches the master mode 110, a second controller 225 of the second computing device 170 launches a slave mode 115. Similar to the first controller 220, the second controller 225 can be a processor, such as a complex instruction set computing (CISC) processor. If the second computing device 170 is in the slave mode 115, the second controller 225 can disable, suspend, or not launch a second operating system 275 of the second computing device 170. By disabling, suspending or not launching the second cooperating system 275, the first controller 220 and/or the first operating system 205 can control and manage both the first computing device 100 and the second computing device 170.

If the first computing device 100 launches the master mode 110 and the second computing device 170 launches the slave mode 115, the first computing device 100 can operate as a tablet computing device and the second computing device 170 can operate as a receiver. The first controller 220 and/or the first operating system 205 enable a communication component 130 of the first computing device 100 to wirelessly communicate with the second computing device 170. The communication component 130 is a hardware component, such as a Bluetooth component, a near field communication component, an infrared and/or a wireless radio for the first computing device 100 to wirelessly transmit instructions and communicate with the second computing device 170.

In another example, as illustrated in FIG. 2B, the first computing device 100 is physically docked with the docking component 180. The interface component can provide notification that that the first computing device 100 is physically docked with the docking component 180 and the first controller 220 launches a slave mode 115. When operating in the slave mode 115, the first computing device 100 acts as a secondary or slave device to receive commands or instructions from the second controller 225 and/or the second operating system 275. If the first computing device 100 is in the slave mode 115, the first controller 220 can further disables, suspend, and/or not launch the first operating system 205 of the first computing device 100.

The docking component 180 of the second computing device 170 can also provide a notification that the docking component 180 is coupled to the interface component. The second controller 225 can then launches a master mode 110 on the second computing device 170. The second controller 225 can further launch the second operating system 275 to be used independently and/or in conjunction with the second controller 225 to control and manage the first computing device 100. The second operating system 275 is a complex instruction set computing (CISC) operating system which includes software and/or firmware to be used independently and/or in conjunction with the second controller 225 to control and manage both the first computing device 100 and the second computing device 170. In response to the first computing device 100 and the second computing device 170 switching between the master mode 110 and the slave mode 115, context is switched between the first computing device 100 and the second computing device 170.

Figure 3:
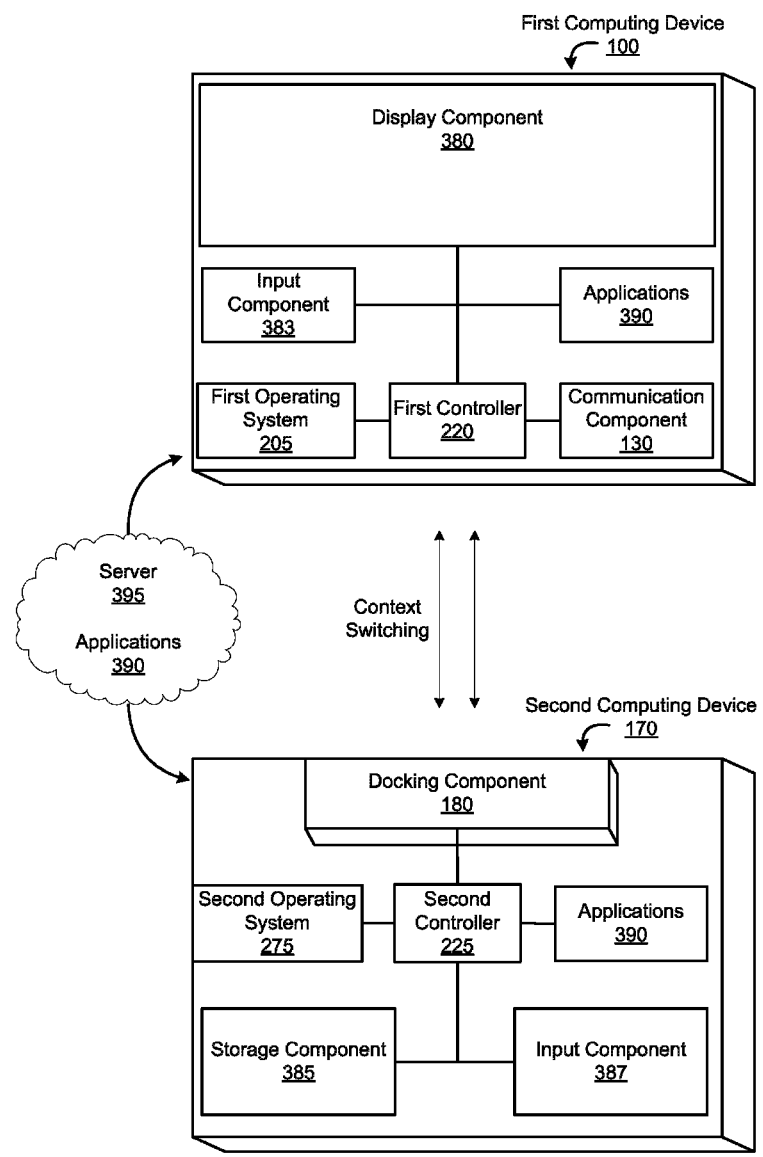
FIG. 3 illustrates a first computing device and a second computing device switching context based on a mode of the first computing device and the second computing device according to an example.

FIG. 3 illustrates a first computing device 100 and a second computing device 170 context switching based on a mode of the first computing device 100 and the second computing device 170 according to an example. For the purposes of this application, context switching includes the computing device operating in the master mode (master mode computing device) receiving control of applications 390 and a state of the applications 390 from the computing device operating in the slave mode (slave mode computing device). Receiving control and a state of the applications 390 can include the first computing device 100 and the second computing device 170 synchronizing applications 390 with one another or with a server 395 coupled to both of the computing devices.

The first computing device 100 can use the communication component 130 for communicating and synchronizing applications 390 with the second computing device 170 and/or the server 395. The second computing device 170 can also include a second communication component (not shown) for communicating and synchronizing applications 390 with the first computing device 100 and/or the server 395. Similar to the communication component 130, the second communication component is a hardware component, such as a Bluetooth component, a near field communication component, an infrared and/or a wireless radio for second first computing device 170 to communicate with the first computing device 100 and/or the server 395.

In one example, synchronizing the applications 390 can include the slave mode computing device transferring to the master mode computing device, applications 390 which are loaded onto a memory of the slave mode computing device. In another implementation, the slave mode computing device transfers the applications 390 to the server 395. The server 395 provides the master mode computing device the applications 390 when the computing device launches the master mode or in response to a request from the master mode computing device. The server 395 acts as a repository for the two computing devices to synchronize applications 390 as they switch between master and slave mode.

In one example, the second computing device 170 can include Application 1, Application 2, and Application 3 loaded onto the memory. If the second computing device 170 launches the slave mode and the first computing device 100 launches the master mode, Application 1, Application 2, and Application 3 are transferred from the memory of the second computing device 170 to the first computing device 100 or to the server 395, Application 1, Application 2, and Application 3 are then loaded onto a memory of the first computing device 100. In another example, if the first computing device 100 subsequently launches the slave mode and the second computing device 170 launches the master mode; Application 1, Application 2, and Application 3 can be transferred from the memory of the first computing device 100 to the second computing device 170 or to the server 395.

In one implementation, the first computing device 100 and the second computing device 170 can further synchronize a state of the applications 390 and files used by the applications 390. The state of an application 390 can identify whether the corresponding application 390 is open, settings of the corresponding application 390, and/or identify files being accessed by the application 390. In other implementations, the state of an application 390 can identify other additional information of the corresponding application in addition to and/or in lieu of those noted above. A file used by the application 390 can include one or more files currently, previously, and/or anticipated to be used or accessed by the corresponding application. In one example, the file can be a media file, a document, and/or webpage.

Synchronizing the state of the application 390 and the files can include the slave mode computing device saving a state of the application 390 and identifying files used by the application 390. The slave mode computing device can save the state of the application 390 in response to the computing device launching the slave mode. The state of the application 390 and the files are transferred to the master mode computing device or to the server 395. The state of the application 390 can be transmitted as a file or as metadata associated with the application 390. In another implementation, the state of the application 390 and the file can be transferred to the server 395 for the server 395 to provide to the master mode computing device.

In another implementation, context switching can also include the slave mode computing device sharing components and resources with the master mode computing device. As illustrated in FIG. 3, the first computing device 100 can further include a display component 380, an input component 383, and a communication component 130. The second computing device 170 can further include a storage component 385 and an input component 387.

For example, if the first computing device 100 launches the master mode and the second computing device 170 launches the slave mode, the first computing device 100 operates at a tablet computing device and the storage component 385 of the second computing device can be used by the first computing device 100 as an external storage component to stream content through the communication component 130 of the first computing device 100.

In another example, if the first computing device 100 is operating in the slave mode and the second computing device 170 is operating in the master mode, the first computing device 100 and the second computing device 170 operate together as a notebook computing device and the display component 380, the input component 383, and the communication component 130 of the first computing device 100 operate as a display, an input, and a communication components of the second computing device 170.

Figure 4:
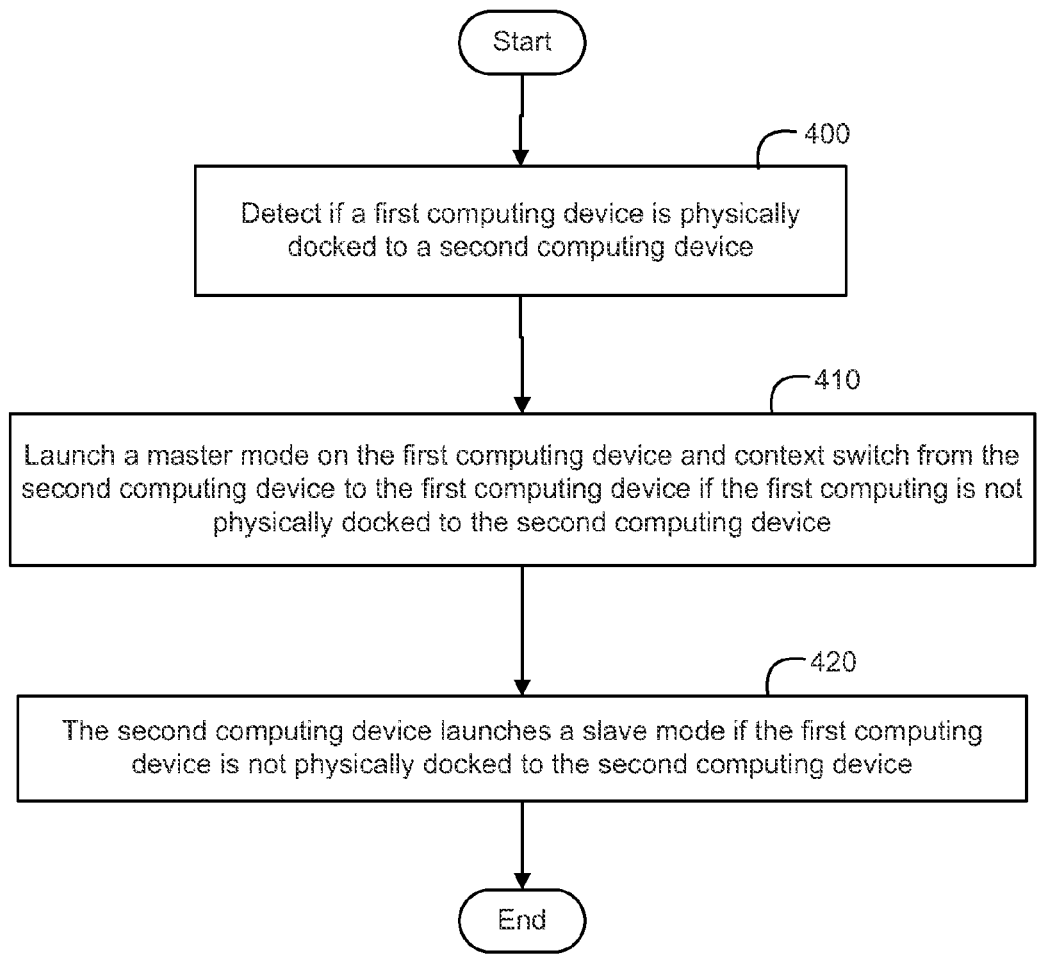
FIG. 4 is a flow chart illustrating a method for switching between a master mode and a slave mode according to an example.

FIG. 4 is a flow chart illustrating a method for switching between a master mode and a slave mode according to an example. The first controller of the first computing device initially detects if the first computing device is physically docked to a second computing device at 400. If the first computing device is not physically docked to the second computing device, the first controller launches a master mode on the first computing device and context is switched from the second computing device to the first computing device at 410. If the first computing device is operating in the master mode, a second controller of the second computing device can launch a slave mode at 420. In response to the first computing device launching the master mode and the second computing device operating in the slave mode, a first operating system of the first computing device is enabled and a second operating system of the second computing device can be disabled or is not launched.

In another embodiment, if the first computing device is physically docked to the second computing device, the first controller launches a slave mode on the first computing device and switches context from the first computing device to the second computing device. The second controller also launches a master mode for the second computing device and enables the second operating system of the second computing device. The first operating system of the first computing device is disabled or is not launched. The method is then complete. In other embodiments, the method of FIG. 4 includes additional steps in addition to and/or in lieu of those depicted in FIG. 4.

What is claimed is:

1. A computing system comprising:
    a first computing device with a communication component to wirelessly communicate with a second computing device;
    wherein the second computing device includes a docking component to dock with the first computing device as a base;
    wherein the first computing device and the second computing device each include an interface component that couples with the docking component, wherein each of the interface components interfaces the first computing device with the second computing device and provides notification when docked;
    wherein the first computing device and the second computing device switch between a master mode and a slave mode based on whether the first computing device is docked with the second computing device, wherein the switch includes synchronization of a state of an application and identification of a file used by the application;
    wherein the first computing device includes a reduced instruction set computing processor and a first operating system and the second computing device includes a complex instruction set computing processor; and
    wherein the first operating system associated with the first computing device is disabled when docked with the second computing device.

2. The computing system of claim 1 wherein the first computing device operates in the master mode and the second computing device operates in the slave mode when the first computing device is not docked with the second computing device.

3. The computing system of claim 1 wherein the first computing device operates in the slave mode and the second computing device operates in the master mode when the first computing device is docked with the second computing device.

4. The computing system of claim 1 wherein the second computing device includes a second operating system.

5. The computing system of claim 4 wherein the second operating system is enabled when the first computing device is docked with the second computing device.

6. The computing system of claim 3, wherein the first computing device entering the slave mode switches context of the application to the second computing device entering the master mode.

7. The computing system of claim 6 wherein the second computing device entering the master mode receives at least one of a state of the application and a file used by the application from the first computing device entering the slave mode or a server hosting the application.

8. A method for switching between a master mode and a slave mode comprising:
    detecting a first computing device is physically docked to a second computing device wherein the first computing device includes a reduced instruction set computing processor and the second computing device includes a complex instruction set computing processor, wherein the first computing device and the second computing device each include an interface component that couples with the docking component, wherein each of the interface components interfaces the first computing device with the second computing device and provides notification when docked;
    launching a master mode on the first computing device and context switching from the second computing device to the first computing device when the first computing device is not physically docked to the second computing device, wherein the context switching includes synchronization of a state of an application and identification of a file used by the application; and
    wherein the second computing device launches a slave mode and includes context switching of the application to the first computing device entering the master mode when the first computing device is not physically docked to the second computing device.

9. The method for switching between a master mode and a slave mode of claim 8 wherein a first operating system of the first computing device is enabled and a second operating system of the second computing device is disabled when the first computing device launches the master mode.

10. The method for switching between a master mode and a slave mode of claim 8 further comprising launching a slave mode on the first computing device and context switching from the first computing device to the second computing device when the first computing device is physically docked to the second computing device.

11. The method for switching between a master mode and a slave mode of claim 8 wherein context switching includes the first computing device and the second computing device synchronizing at least one of an application, a state of the application, and a file used by the application.

12. The method for switching between a master mode and a slave mode of claim 10 wherein the second computing device launches the master mode when the first computing device is physically docked to the second computing device.

13. The method for switching between a master mode and a slave mode of claim 12 wherein a second operating system of the second computing device is enabled and a first operating system of the first computing device is disabled when the second computing device launches the master mode.

14. The method for switching between a master mode and a slave mode of claim 11 wherein the first computing device and the second computing device synchronize the application, the state of the application, and the file used by the application with one another.

15. The method for switching between a master mode and a slave mode of claim 11 wherein the first computing device and the second computing device synchronize the application, the state of the application, and the filed used by the application with a server.

16. A computing device to couple with a second computing device comprising:
   a communication component to communicate with the second computing device when the first computing device is not docked with the second computing device;
   wherein the first computing device and the second device each include an interface component to interface the first computing device with the second computing device and to notify the second computing device of the docked first computing device, wherein the second computing device controls the first computing device when the first computing device is docked with the second computing device;
   a controller to switch the first computing device between a master mode and a slave mode for context switching based on whether the first computing device is docked with the second computing device, wherein the context switching includes synchronization of a state of an application and identification of a file used by the application, wherein the first computing device includes a reduced instruction set computing processor and a first operating system, wherein the second computing device includes a complex instruction set computing processor, and wherein the first operating system is disabled when docked with the second computing device; and
   wherein the second computing device launches the slave mode and switches context of the application to the first computing device entering the master mode when the first computing device is not physically docked to the second computing device.

17. The computing device to couple with a second computing device of claim 16 wherein the second computing device operates in the slave mode and as a storage component for the computing device when the computing device is not docked with the second computing device.

18. The computing device to couple with a second computing device of claim 16 wherein the communication component includes at least one a near field communication component, a Bluetooth component, an infrared component, and a wireless radio component.

19. The computing device to couple with a second computing device of claim 16 wherein the computing device is a portable computing device which includes a display component and an input component.

20. The computing device to couple with a second computing device of claim 19 wherein components of the portable computing device operate as a display component, an input component, and a wireless communication component for the second computing device when the computing device is docked with the second computing device.

* * * * *